K. GEBHARDT, GEB. ZURKALOWSKI.
DEVICE FOR PREPARATION OF EXTRACTS.
APPLICATION FILED OCT. 27, 1913.
1,235,791.
Patented Aug. 7, 1917.
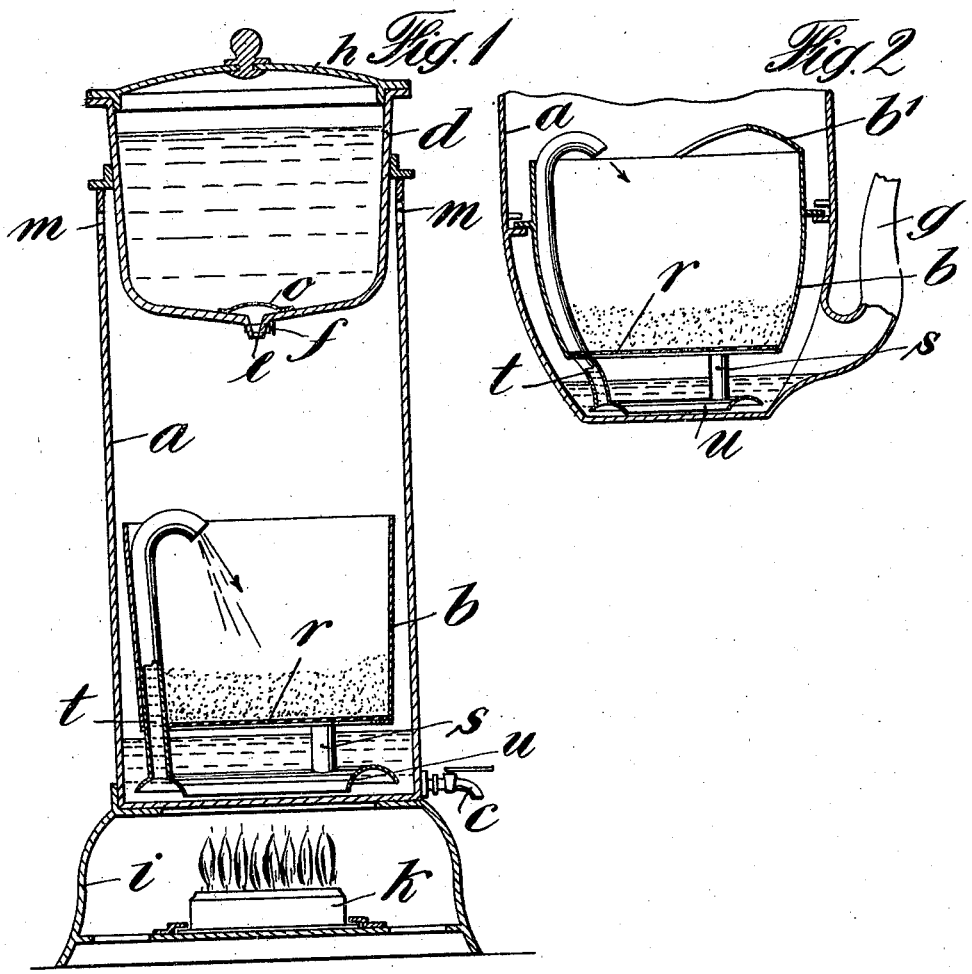

UNITED STATES PATENT OFFICE.

KATHARINA GEBHARDT, geb. ZURKALOWSKI, OF BERLIN, GERMANY.

DEVICE FOR PREPARATION OF EXTRACTS.

1,235,791.   Specification of Letters Patent.   Patented Aug. 7, 1917.

Application filed October 27, 1913. Serial No. 797,489.

*To all whom it may concern:*

Be it known that I, KATHARINA GEBHARDT, *geb.* ZURKALOWSKI, a subject of the German Emperor, and a resident of Berlin, Germany, have invented certain new and useful Improvements in Devices for the Preparation of Extracts, of which the following is a specification.

The apparatus made in accordance with the present invention is so constructed that the substance treated (coffee powder, tea, fruit, for instance parts of fruit, cornmalt, meat, etc.,) is not immediately covered over with the extraction liquid, water for instance, but is freely spread in a dry state at an ordinary temperature and is first treated with steam which penetrates and opens it to a certain extent and which also penetrates it for the extraction operation. The extraction now commences on one side by the downward flow of water, at an ordinary temperature, in the shape of a thin jet or a shower upon the substance treated and on the other side by the substance itself which becomes more liquid every minute by means of a heating device; and mixes with the heated water at the bottom of the vessel and is thrown together with the downward flowing cold water on to the substance and thus penetrates it again. The alternating effects of cold and hot liquids namely the influence exerted by the liquid at an ordinary temperature on the upper part of the substance treated and the influence exerted by the hot liquid on its lower part, cause a strong circulation which penetrates the substance completely, and causes the extraction and also the complete lixiviation. The fresher and colder the downward flowing water is, the more appropriate will it be for the purpose aimed at, because such water contains proportionally plenty of absorbed air and oxygen. To this end, cold water is permitted to flow as long as the heating device is in operation, but the quantity of water used for each particular extraction must be predetermined and the time necessary for its outflow regulated.

The effect of this process of extraction is very favorable in many ways. By means of the particular arrangement, namely on one hand, the heating of the mixture of extract previously obtained by steam and of the cold water acting continuously on the underside of the substance treated and, on the other hand the slow and continuous addition of more cold water which tends to moderate the heating of the substance and insures an efficient operation, the extract will retain the aromatic oils although the whole of the substance is more completely penetrated and extracted.

It is preferable that the temperature should not reach the boiling point, but even if it does then the quantity of freed aromatic oils (which are the most valuable extractive substances) is by far not so great as if the substance of extraction (for instance coffee) had been covered with water in the ordinary way and the whole heated to the boiling point. This is clearly recognized by the pleasant odor and taste of the extract obtained by the new process. The greatest proof is the relatively long durability of the extracts, which if prepared by other processes easily deteriorates for the lack of aromatic oils which act as an efficient preservative even if they are present only in small quantities.

Another effect of the present process of extraction is especially valuable for the preparation of coffee extracts. Owing to the cold water containing air and oxygen which through molecular movements is diffused into all parts of the substance, the decomposition of the caffeotannic acid of potassium caffein will be retarded. While the said double salt is split by boiling (or nearly boiling) water and the coffee beverage obtained is rendered bitter because it contains a relatively large quantity of free caffeotannic acid (even the caffein which is contained freely in such beverages in a proportionally large quantity, has a bitter taste) the coffee extract obtained by the new process tastes agreeably and is only very slightly bitter.

In this particular process of extraction the albumin is for the greater part dissolved and does not render the extract turbid by its undissolved condition as it is the case in the known process. Filtration of the extracts obtained by the new process through filters, bags, filtering papers, etc., is not necessary for they are quite clear owing to the greater penetration of the extraction agents. Another important fact is that the extracts remain clear while those obtained by other processes, even if they are carefully filtered, become turbid again in a comparatively short time because the albumin and resinous substances partly become insoluble while the extractive substances remain largely dissolved in the new extracts. A further great advantage is that the obtained extracts are very rich and that the extraction agent is used in a highly economical manner.

The device utilized in carrying out the present process, differs from those constructed hitherto, in the respect that the special extraction vessel contains a reservoir in its upper part which comprises a controlled outlet orifice for delivering cold liquids. In large apparatus this cold water is delivered to the substance from a separate reservoir mounted over the extraction vessel; said substance being freely spread over one or more sieves arranged in the lower part of the vessel and at a certain distance from the bottom. The substance is, as it has been already described, acted upon its lower part by the steam, formed in the meantime, which penetrates and opens it, further it will be efficiently lixiviated by the downward flowing liquid at a lower temperature and is collected at the bottom of the extraction vessel or immediately delivered from the latter in an appropriate manner.

The repeated and continuous returning of the hot liquid, through the substance, to the bottom of the vessel already referred to, takes place at the same time as the extraction (the liquid consisting of a mixture of the extracting liquid and of the extract obtained so far) and is effected by means of an appropriate device fixed on or in the sieve holder. This device acts as a return pipe for the liquid and if desired for the dissolved extractive substances (albumen, resin, etc.) the liquid being thus filtered again.

The device will be better understood by examining the accompanying drawing in which:—

Figure 1 shows a vertical section through the extraction vessel which comprises, in its upper part, a cold water reservoir with its delivery device and its lower part a sieve containing an upwardly extending pipe for returning the liquid collected at the bottom.

Fig. 2 shows a modification of the lower part of the vessel as used for a coffee-percolator, with a removable sieve.

The extraction vessel $a$ comprises in its lower part a removable sieve-holder $b$ arranged at a certain distance from the bottom and provided with one or more sieves $r$ of any form and shape. The sieves are kept at a distance from the bottom of an extraction vessel $a$, by means of stays $s$ which also serve as supports for the sieve-holder. One or more of the stays $s$ can be turned into upwardly extending pipes $t$ and introduced into the sieve-holder $b$. Referring to Fig. 1, it will be seen that the liquid collected at the bottom of the extraction vessel $a$ is pumped continuously or intermittently during the heating operation through the pipe $t$ into the sieve-holder, that is, on the substance of extraction which is spread on the sieves. The stays $s$ can be connected below the sieve holder by means of a ring $u$, of an inverted U-shape which serves to lead the liquid from the lower part of the extraction vessel to the pipe $t$, from here into the sieve-holder and finally on top of the sieve carrying the substance to be treated. In the device illustrated in (Fig. 2) the sieve-holder $b$ is provided on its upper edge and nearest to the spout $g$, with a curved guard $b'$ which prevents the substance in the sieve-holder $b$ from flowing out when the ready extract is being poured out through the spout. The spout could be provided with a cover or any other suitable closing means so as to prevent any overflow in case the liquid should be boiling. An outlet cock $c$ is provided below the sieve-holder $b$ at the bottom of the fixed extraction vessel $a$ (Fig. 1). A reservoir $d$ is so arranged in the upper part of the vessel $a$ as to be easily removable and comprises a restricted outlet passage $e$ which is provided with a cock for any other appropriate means of controlling the flow. A small sieve or filter $o$ could be arranged on the top of the outlet passage $e$ as shown in Fig. 1.

The reservoir $d$ serves at the same time as a cover for the extraction vessel $a$. The latter is provided with orifices $m$ on its upper edge to permit of easily drawing off the extract through $c$ or $g$ (outlet cock or spout). The vessel $a$ is supported by a suitably built base $i$ in which an alcohol burner $k$ or any other appropriate heating device can be placed.

When using the apparatus the cock $c$ is shut off (in case there is no spout $g$ in its stead) some cold water poured in the lower part of the extraction vessel and the sieve-holder $b$ is provided with the necessary quantity of coffee powder or any other substance which is to be treated according to the extract desired, after which the sieve-holder is put in place. The heating flame below the vessel $a$ is then lighted, and the upper reservoir $d$ is placed in position; the controlling means $f$ in the outlet passage $e$ being so arranged that the liquid contained in the reservoir $d$ will be poured out in a steady stream for, say, 10 or 15 minutes, the time necessary for the preparation of the extract. The distance of the outlet passage $e$ from the sieve-holder should not be too small as it is desired that the liquid flowing from $d$ should drop with a certain force. The reservoir $d$ is provided with a cover $h$.

The process of extraction goes on in the manner already explained and an extract is obtained which is highly aromatic and has a slightly bitter pleasant taste owing to the fact that it contains only a very small amount of free caffein and caffeotannic acid, which are injurious to the health.

After the flame has been extinguished and the upper reservoir is nearly empty, which kept down the temperature of the contents of the vessel the extract is drawn off through the cock $c$ or the spout $g$.

Should it happen that the first part of the new extract is turbid then this additional amount can be poured in the sieve-holder $b$ by lifting the cover $h$ and the reservoir $d$; it will be thus filtered again through the partly or wholly lixiviated substances treated and if drawn off again it will be found to be clear.

The reservoir $d$ can be filled with any other liquids instead of water, for instance it can be filled with milk so as to obtain milk-coffee, or some other suitable substance.

In preparing extracts from other substances treated in the new manner, the devices would have to be modified accordingly. The heating need not be done directly by may be effected by a waterbath in which case the devices would have to be modified accordingly.

What I claim as new and desire to secure by Letters Patent is:

1. An apparatus for the preparation of extracts from foods and the like, such as coffee beans, malt coffee, tea, fruits including sugar beet roots, parts of fruit, cornmalt, meat and the like, comprising in combination a vessel adapted to be heated and provided with a sieveholder, carrying an upwardly extending pipe, a reservoir arranged in the upper part of the vessel, said reservoir being provided with an outlet passage directed into the sieveholder, which can be regulated as desired, substantially as described.

2. Apparatus of the class described, having in combination a vessel for holding the liquid extract, means for heating the same, means supporting the material from which the extract is made, above the liquid extract in the vessel, a cold liquid reservoir above the said supporting means and provided with means for discharging the cold liquid to said material, and means for conveying the hot liquid extract or vapors therefrom above the material, to be discharged thereon.

3. An apparatus for the preparation of extracts from foods and the like, such as coffee beans, malt coffee, tea, fruits including sugar beet roots, parts of fruits, cornmalt, meat and the like, comprising in combination a vessel provided with a sieveholder carrying an upwardly extending pipe, a reservoir arranged in the upper part of the vessel, said reservoir being provided with an adjustable outlet passage leading into the sieveholder, and an outlet pipe, arranged in the lower part of the vessel and provided with closing means, substantially as described.

4. In an apparatus of the character set forth, the combination of a vessel, adapted to be heated on the bottom, a strainer arranged at a short distance above the bottom of the vessel, a pipe adapted to carry heated fluid from the bottom of the vessel and discharge it into said strainer, a reservoir for cold water in the upper part of said vessel, said reservoir having an outlet leading to the strainer, and means for controlling the flow of liquid from the reservoir to the strainer.

In testimony whereof I affix my signature in presence of two witnesses.

FRAU KATHARINA GEBHARDT,
     GEB. ZURKALOWSKI.

Witnesses:
 WOLDEMAR HAUPT,
 HENRY HASPER.

Copies of this patent may be obtained for five cents each, by addressing the "Commissioner of Patents, Washington, D. C."